(12) United States Patent
Barreto et al.

(10) Patent No.: US 11,798,016 B2
(45) Date of Patent: Oct. 24, 2023

(54) EVENT-TRIGGERED MICROSURVEY CUSTOMIZATION AND DELIVERY SYSTEM

(71) Applicant: UserLeap Inc., San Francisco, CA (US)

(72) Inventors: Amos Jose Barreto, San Francisco, CA (US); Kevin Matthew Mandich, San Francisco, CA (US); Ryan James Glasgow, San Francisco, CA (US); Christopher Lee Oyler, Austin, TX (US)

(73) Assignee: SPRIG TECHNOLOGIES INC., San Francisco, CA (US)

( * ) Notice: Subject to any disclaimer, the term of this patent is extended or adjusted under 35 U.S.C. 154(b) by 23 days.

(21) Appl. No.: 17/331,561

(22) Filed: May 26, 2021

(65) Prior Publication Data

US 2022/0383346 A1    Dec. 1, 2022

(51) Int. Cl.
*G06Q 30/02*     (2023.01)
*G06Q 30/0203*   (2023.01)
*G06F 11/34*     (2006.01)
*G06Q 30/0242*   (2023.01)

(52) U.S. Cl.
CPC ..... *G06Q 30/0203* (2013.01); *G06F 11/3438* (2013.01); *G06Q 30/0245* (2013.01)

(58) Field of Classification Search
CPC ............ G06Q 30/0203; G06Q 30/0245; G06F 11/3438; G06N 20/00
See application file for complete search history.

(56) References Cited

U.S. PATENT DOCUMENTS

| | | | | |
|---|---|---|---|---|
| 5,819,041 A | * | 10/1998 | Bilgic | H04W 88/08 455/418 |
| 2005/0074061 A1 | * | 4/2005 | Ribas-Corbera | H04N 19/51 375/E7.199 |
| 2013/0046582 A1 | * | 2/2013 | Ramer | G06Q 10/101 705/7.32 |
| 2014/0280609 A1 | * | 9/2014 | Averbeck | H04L 51/56 709/206 |

(Continued)

OTHER PUBLICATIONS

Approaches to Machine Learning, P. Langley at Carnegie-Mellon University (Year: 1984).*

(Continued)

*Primary Examiner* — Breffni Baggot
(74) *Attorney, Agent, or Firm* — Fenwick & West LLP

(57) ABSTRACT

A real-time survey system can monitor real-time event and interaction data generated as a user interacts with an application. Using the event data in combination with static user attributes, the survey system can identify a subset of microsurveys a user is eligible to receive or participate in. Identifying eligibility can include applying one or more filters based on user attributes as well as detecting a triggering event that signals real-time relevance of the survey to the user's actions. If the user is eligible for multiple surveys, the survey system can select a single survey to send to the user. Surveys can be presented to users directly using the real-time survey system instead of via an alternate delivery method, such as email. After collecting survey data, survey system can automatically analyze survey responses, including by performing machine learning based thematic analysis on freeform text responses.

18 Claims, 7 Drawing Sheets

(56) References Cited

U.S. PATENT DOCUMENTS

| | | | |
|---|---|---|---|
| 2015/0193794 A1* | 7/2015 | Douglas | G06Q 30/0203 |
| | | | 705/7.32 |
| 2021/0109994 A1* | 4/2021 | Sengupta | G06N 5/04 |
| 2021/0295358 A1* | 9/2021 | Li | G06Q 30/0245 |

OTHER PUBLICATIONS

University of Chicago, Too Many Metrics: Measuring Social Media Impact (Year: 2015).*

* cited by examiner

EVENT-TRIGGERED MICROSURVEY CUSTOMIZATION AND DELIVERY SYSTEM

BACKGROUND

This disclosure generally relates to dynamic administration and processing of surveys within an application and, in particular, to event-triggered survey administration and automatic response analysis.

In general, surveys can be invaluable in providing online services additional data to improve their value to users. For example, survey data can provide user feedback on various areas of the online service (such as new features or the overall experience), can allow users to report bugs or problems, or provide insights into which features or changes would be good targets for future development.

However, traditional methods of sending surveys to users (such as email blasts or immediate surveys of all eligible users) can be inefficient at reaching an optimal, desired, or representative set of users. Similarly, traditional survey methods can fail to deliver surveys at the correct timing proximate to the event or action the survey is asking about. Similarly, surveys, while helpful in the long term to improve a service, can be annoying for users to receive and respond to, so the number of surveys sent out should be minimized (while still gathering the desired number of responses for getting actionable results from the survey).

Traditionally, survey responses are manually reviewed and analyzed to identify a small set of major themes common to multiple responses. When performing manual thematic analysis, a researcher will gather and read through responses individually, then mentally form an idea of the general themes seen in the responses. These themes can represent actionable and granular takeaways that can be reported to a product owner or similar stakeholder after the analysis is complete (such as, "users are unhappy with the log in process"). After deciding on the set of themes, the researcher can go through some or all responses to pick out responses matching each selected theme.

This process is fairly difficult to fully automate or replicate with computer analysis. In some cases, a machine learning approach using NLP models trained for topic modeling (where noun and verb phrase topics are extracted and grouped) is used. However, this technique is not currently suitable to emulate and replace manual thematic analysis work as the topic groups produced using traditional automated techniques fail to reach the granularity or usability of the identified themes from manual thematic analysis.

SUMMARY

A real-time survey system can monitor real-time event and interaction data generated as a user interacts with an online service via an associated application. Using the event data in combination with static user attributes, the survey system can identify a subset of microsurveys a user is eligible to receive or participate in. Identifying eligibility can include applying one or more filters based on user attributes as well as detecting a triggering event that signals real-time relevance of the survey to the user's actions. If the user is eligible for multiple surveys, the survey system can select a single survey to send to the user, based on a sampling rate of the survey, how close each survey is to one or more target response distribution metrics, or the like. Surveys can be presented to users directly via an interface of the application running on the user's device (instead of via an alternate delivery method, such as email). After collecting survey data, survey system can automatically analyze survey responses, including by performing machine learning based thematic analysis on freeform text responses.

Figure 1:
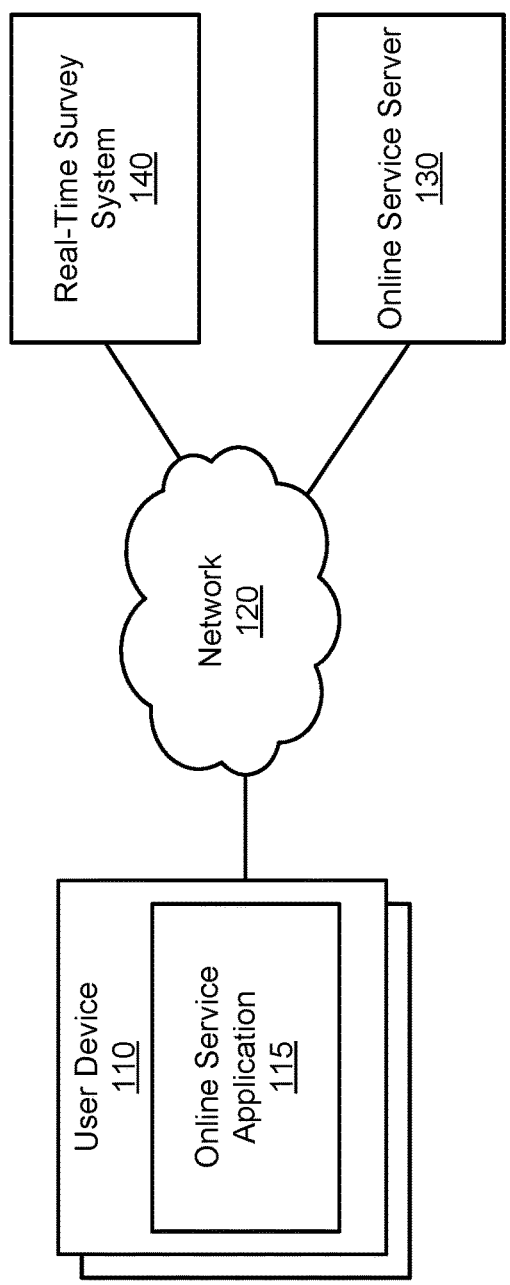
FIG. 1 is a block diagram of a system environment in which a real-time survey system operates, in accordance with an example embodiment.

The figures depict various embodiments for purposes of illustration only. The figures use like reference numerals to identify like elements. One skilled in the art will readily recognize from the following discussion that alternative embodiments of the structures and methods illustrated herein may be employed without departing from the principles described herein.

DETAILED DESCRIPTION

System Architecture

FIG. 1 is a block diagram of a system environment in which a real-time survey system operates, in accordance with an example embodiment. The environment 100 of FIG. 1 includes a set of user devices 110 running an online service application 115, a network 120, an online service server 130 associated with the application 115, and a real-time survey system 140. In other embodiments, the environment 100 may include additional, fewer, or different entities. For example, only one online service application 115 and online service server 130 is shown in environment 100, but other implementations can include multiple applications 115, each associated with one more online service servers 130. Similarly, the online service server 130 and the real-time survey system 140 are shown as separate entities, but in some embodiments, the real-time survey system may be integrated within the online service server 130.

Each user device 110 includes one or more computing devices capable of displaying content to users, receiving user input, and transmitting and/or receiving data via the network 120. A user device 110 can include conventional computing systems, such as desktop or laptop computer, personal digital assistants (PDA), mobile phones, smartphones, smartwatches, wearable devices, or other suitable devices. Each user device 110 can be configured to communicate with the online service server 130 or real-time survey system 140 via the network 120. In some implementations, user devices 110 execute an online service application 115 associated with an online service server 130.

The online service application 115 can allow a user of the user device 110 to interact with the online service server 130 and/or real-time survey system to view content, provide user input, and/or view and respond to real-time surveys based on their activities within the online service application 115. For example, the online service application 115 can be a browser application enabling interaction between the user device 110 and the online service server 130 via the network 120. In other cases, user devices 110 interact with the online service server 130 through an application programming interface (API) running on a native operating system of the user device 110. In some implementations, the online service application 115 is affiliated with the online service server 130, for example, the online service application 115 and online service server 130 can be created and managed by the same entity.

An online service application 115 can record and store event data about the user's actions as the user interacts with the online service application 115. In some implementations, this data is later sent to the real-time survey system 140 for aggregation and analysis of survey results. In some embodiments, the online service application 115 displays real-time survey content to users via a user interface (UI) or UI element appearing in addition to the standard application UI for interacting with the online service server 130. The online service application will be discussed further in relation to FIG. 2.

In some implementations, the user devices 110, online service server 130, and real-time survey system 140 are configured to communicate with each other via the network 120. The network 120 can comprise any combination of local area and/or wide area networks and both wired and/or wireless communication systems. The network 120 can use standard communications technologies and/or protocols such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, some or all communication links of the network 120 are encrypted or otherwise secured using any suitable technique or techniques.

The online service server 130, according to some embodiments, includes a set of servers or other computing systems capable of controlling and delivering content to users via the online service application 115, managing user interaction with the online service application 115, and/or providing a service to users of the online service application 115. The online service server can include conventional computing systems, such as server computers, server clusters, cloud storage or computing capability, or other suitable systems. The online service server 130 can be configured to communicate with user devices 110 or the real-time survey system 140 via the network 120.

Depending on the implementation, the online service application 115 can provide many different types of service to users. For example, the online service server can provide content (for example user-created, entertainment, artistic, or editorial content), allow for ecommerce, or allow users to play games, among many other potential features that could be provided by the online service server 130. In some cases, the administrators of the online service server 130 seek to improve the user experience of users of the online service application 115 or gain a better understanding of how users are using the online service application 115 through surveying users through the real-time survey system 140. The real-time survey system 140 can be an outside vendor or otherwise separate from the online service server 130 or, as described above, can be integrated within the online service server 130.

In some embodiments, the real-time survey system 140 (also referred to as the RTSS 140) is a set of servers or other computing systems capable of managing and executing one or more survey campaigns gathering data from users of an online service application 115. The RTSS 140 can include conventional computing systems, such as server computers, server clusters, cloud storage or computing capability, or other suitable systems. The RTSS 140 can be configured to communicate with user devices 110 or the online service server 130 via the network 120.

As used herein, a survey is an individual set of questions that can be sent to one or more users as part of a survey campaign. Some implementations and examples are described herein in the context of "microsurveys" or short surveys often containing two or less questions, though these techniques can also be implemented with longer formats of survey. A survey campaign (as administered by the RTSS 140) includes a process of generating and sending surveys to multiple users to and analyzing the received results to determine a result of the survey campaign. In some implementations, the RTSS 140 can dynamically assign surveys to users for many different simultaneous survey campaigns. Because the same user may be eligible for many different surveys assigning users is not trivial and may require selection between multiple campaigns a given user is eligible for. In some embodiments, the RTSS 140 can automatically analyze user responses to survey questions (including difficult to interpret freeform questions). The RTSS 140 can interface with the online service application 115 running on a user device 110 to display survey content to a user of the device 110.

Figure 2:
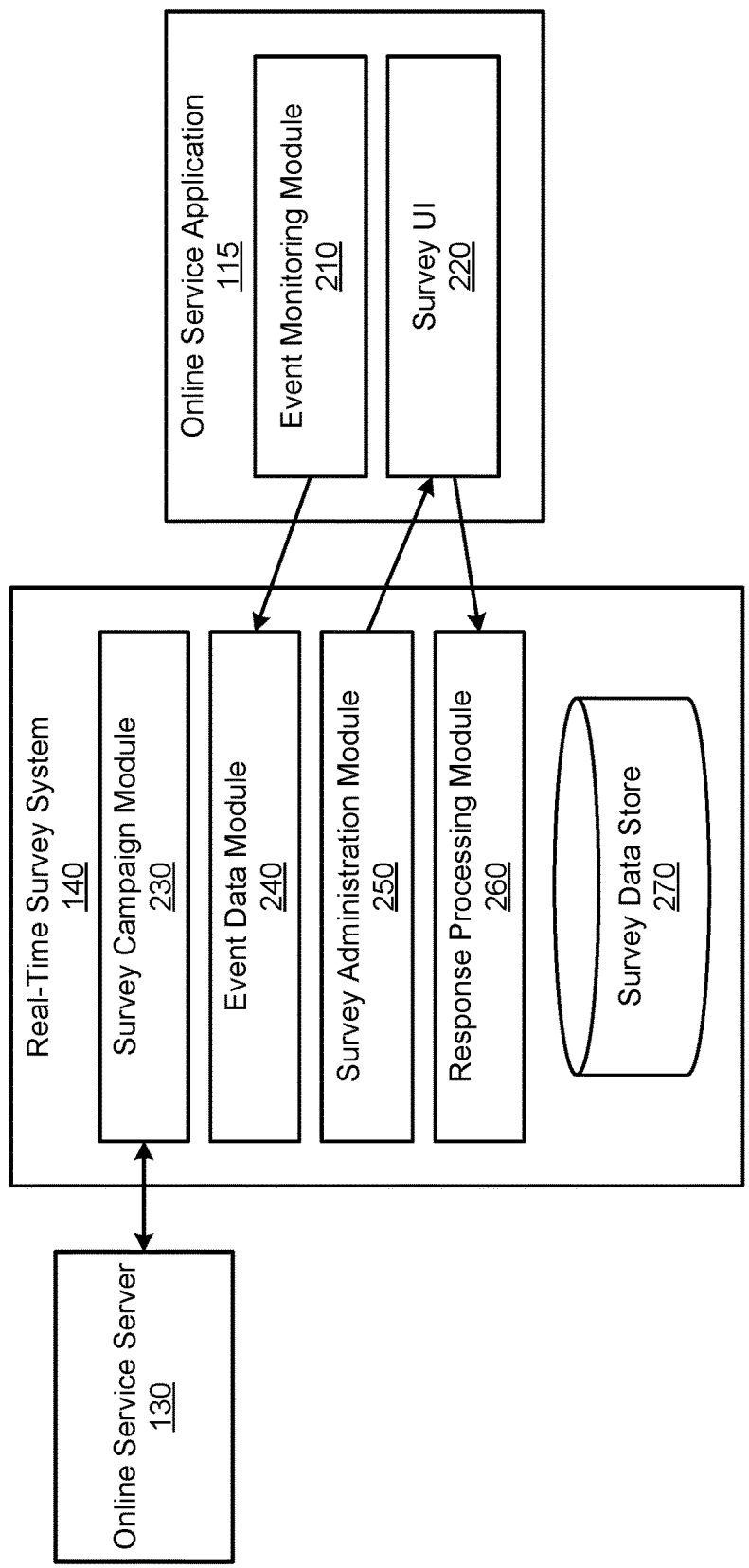
FIG. 2 is a block diagram showing the architecture of a real-time survey system, in accordance with an example embodiment.

FIG. 2 is a block diagram showing the architecture of a real-time survey system, in accordance with an example embodiment. The RTSS 140 shown in FIG. 2 includes a survey campaign module 230, event data module 240, survey administration module 250, response processing module 260, and survey data store 270. The RTSS 140 is in communication with the online service server 130 and an online service application 115, which includes an event monitoring module 210 and survey UI 220. In other embodiments, the RTSS 140 and online service application 115 can include additional, fewer, or different components for various applications. Conventional components such as network interfaces, security functions, load balancers, failover servers, management and network operations consoles, and the like are not shown so as to not obscure the details of the system architecture.

The online service application 115 shown in FIG. 2 includes an event monitoring module 210 which can gather data about users' actions as they interact with the online service application 115.

Event data gathered by the event monitoring module 210 can include an identifier of the event, an identifier of the user and/or user device 110, a timestamp of the event, and/or other properties of the event. In some embodiments, the event monitoring module 210 sends collected event data to the RTSS 140 for use in selecting surveys for that user. Event data can be collected, processed, and sent by the event monitoring module 210 in real-time or near real-time such that the RTSS 140 can send relevant surveys in a timely manner.

For example, the event monitoring module 210 can collect event data when a user clicks on links within the online service application 115, view or interacts with content through the application 115, uses one or more features of the application 115, or generally interacts with the application 115 in a measurable way. In some implementations, the event monitoring module 210 can collect data on "programmatic events" tracking action that users take within the application 115, such as logins, cart checkouts, or completed transactions. Similarly, the event monitoring module 210 can monitor "URL events" triggered when a user visits a specific page or type of page within the application 115 (for example, a page with a URL matching a predetermined pattern). Additionally, "interaction events" triggered when a user interacts with a specific element of a UI (such as a button, menu, or text field) can be monitored. Not all events or event types may be monitored for each application 115, depending on the type and features of the application 115 and the requirements of survey campaigns being run by the RTSS 140.

The survey UI 220 of the online service application 115 can, in some implementations, receive survey content from the RTSS 140 and display the survey to the user through a user interface allowing the user to respond to survey questions. After collecting the user's responses, the survey UI transmits the gathered responses to the RTSS 140 for aggregation and analysis. Each survey response sent by the survey UI 220 can include an identifier of the survey the user was shown, the content of the user's response(s), which can include freeform text answers, multiple choice selections, and other types of responses, a timestamp of the response, and (in some implementations), an identifier of the user providing the response.

In some embodiments, by embedding the survey content within the online service application 115 itself, use of the RTSS 140 reduces the computational load on the user device 110, which otherwise would have to use a separate email application or generate a new browser window (potentially requiring opening a separate application browser application). Instead, directly including the survey within the survey UI 220 improves the responsiveness of the user device 110 in displaying surveys (for example reducing the time between receiving a survey and actually having survey content displayed to the user) and can improve the user experience for a user receiving a survey.

Figure 5:
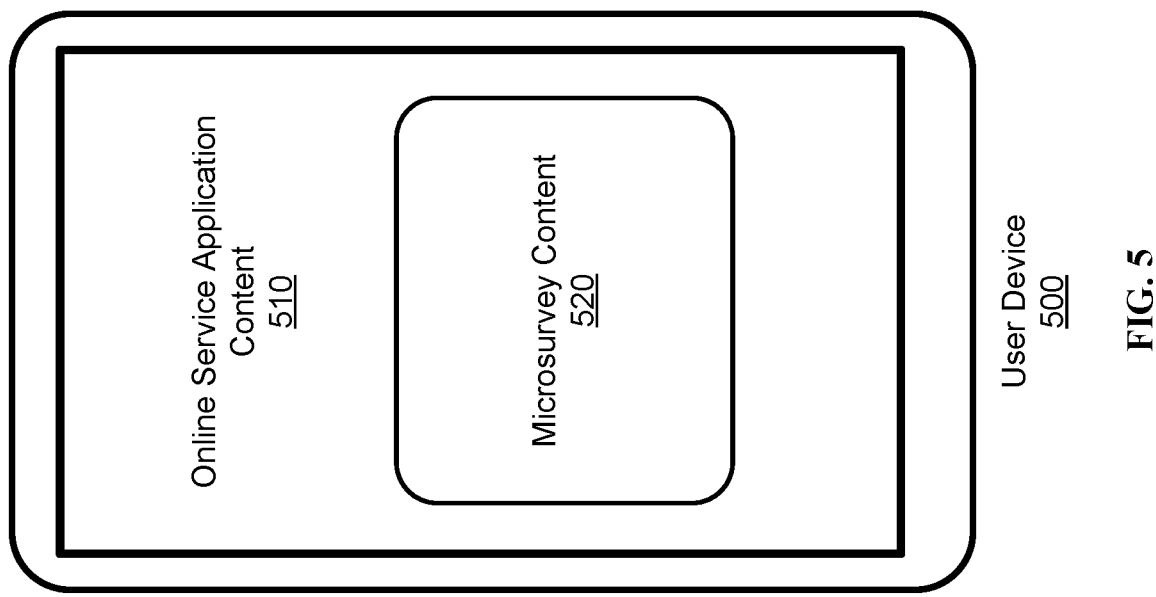
FIG. 5 shows an example user interface for displaying real-time survey content to a user of the application, in accordance with an example embodiment.

The survey UI can be displayed as a pop-up over an existing UI of the online service application 115, be presented in its own UI screen, or be presented to a user in another suitable fashion. In some implementations, survey content can be received by the survey UI 220, which can wait until a later time to administer the survey. For example, the survey UI 220 may wait until a user is finished entering payment details or the like before disrupting the user with a survey. A simple example survey UI is shown in FIG. 5.

In some implementations, the RTSS 140 selects and administers surveys for one or more survey campaigns based on event data and user attributes about users of an online service application 115. As described above, events represent data about discrete actions or conditions met by a user at a certain point in time. Attributes, as used herein, are pieces of descriptive information about users, such as persistent characteristics or demographics. In some implementations, events may be automatically detected and forwarded to the RTSS 140. Similarly, attributes can be directly provided by users based on information provided by the user at sign-up for the service (or at another explicit opt-in point), received directly from an online service application 115, or provided by the online service server 130 in the form of a user attribute file, public API, or database access. For example, when users may provide email, product plan, and geographic location/address attributes when they create a paid account with the online service application.

In some embodiments, the survey campaign module 230 sets up and maintains survey campaigns for one or more online services 130. The survey campaign module 230 can communicate with the online service server 130 to determine parameters for various survey campaigns. For example, a survey campaign can include one or more surveys, each with different questions and different prerequisites for being shown to users (herein, "survey constraints"). For example, survey constraints can select for users who triggered a certain event within a threshold time or users associated with a given event a threshold amount of times. A survey campaign can also have other properties such as a resurvey rate controlling how often the same user can be surveyed (for that campaign or for any survey sent by the RTSS 140) and a desired response rate or target sample size for collecting data. Once a survey campaign is set up and activated, the RTSS 140 can begin monitoring event data and sending surveys to users for that survey campaign.

A survey campaign can also be associated with one or more parameters of the survey campaign itself, for example if the survey campaign is a fixed or continuous survey campaign. In a fixed campaign, the exact amount of responses they would like to receive (i.e. the sample size of the survey) is defined at campaign creation. The RTSS 140 can then serve surveys until the desired sample size is reached before ending the survey and returning analyzed results. A continuous campaign can instead run for an extended period of time, with a desired number of responses per day defined at campaign creation. For continuous surveys, the RTSS 140 can serve surveys throughout the day until the daily response threshold is reached and then wait until the next day to collect more responses. If the threshold is not achieved for a specified day, the system will attempt to "catch up" in the future by collecting more than the daily response threshold.

For example, if an ecommerce online service 130 would like to gather information from customers in Brazil via a survey sent at the moment of checkout, the survey campaign could be configured to use geographical location attributes (provided by the service 130) for each user and monitored programmatic events tracking when a user completes the checkout process to trigger a survey. Once the campaign is activated, the RTSS 140 would serve surveys to and collect responses from Brazilian users who had just completed checkout.

The event data module 240, according to some embodiments, collects and stores received attribute data and event data collected by the online service applications 115. In some implementations, the event data module 240 stores the received data in the survey data store 270. Surveys can include constraints based on historical event data or previously provided attributes, for example a survey could be sent to users who previously used a feature, but haven't recently, or the like. Once collected and logged by the event data module 240, the event and attribute data is ready to be used by the RTSS 140. In some implementations, the event data module 240 collects and stores data in real-time to facilitate real-time triggering of surveys for users based on currently occurring actions.

In some implementations the survey administration module 250 selects and administers surveys to users for survey campaigns based on collected event and attribute data. In some embodiments, administering surveys is a multistep process. In the filtering stage the survey administration module 250 can determine which users are eligible to receive a survey using both events and attributes. Then the survey administration module 250 can trigger the actual sending of the survey by determining when a survey is shown to an eligible visitor using event data. The survey administration module 250 will be discussed further in relation to FIG. 3.

The response processing module 260 receives and analyzes survey responses from administered surveys. In some embodiments, the response processing module 260 uses machine learning techniques and NLP (natural language processing) to automatically analyze survey data. After analysis, the response processing module 260 may send analysis results to the online service server 130 if appropriate. The response processing module 260 may also monitor the overall number of responses for a given survey campaign and determine if enough data has been collected or surveying should continue (based on the properties of that specific campaign). The response processing module 260 will be discussed further in relation to FIG. 4.

The survey data store 270 includes one or more databases, cloud storage solutions, or the like used to store survey campaign details, user attributes, collected event data, and user survey responses. The survey data store 270 can be implemented using any suitable technology and may be local to the RTSS 140, remotely connected via the network 120, or the like.

Survey Selection and Administration

Figure 3:
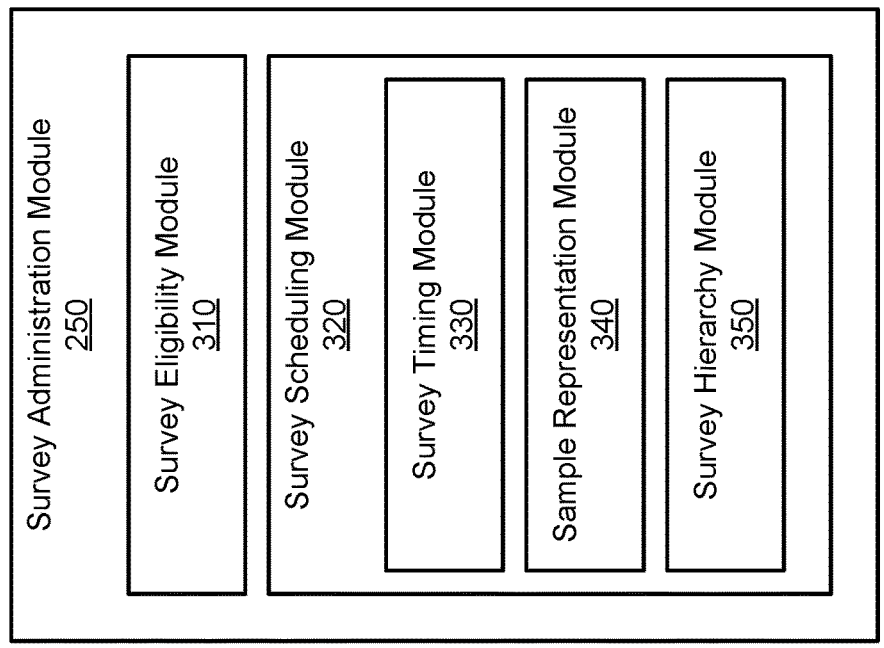
FIG. 3 is a block diagram of a survey administration module of a real-time survey system, in accordance with an example embodiment.

FIG. 3 is a block diagram of a survey administration module of a real-time survey system, in accordance with an example embodiment. The survey administration module 250 shown in FIG. 3 includes a survey eligibility module 310 and a survey scheduling module 320. The survey scheduling module 320 of FIG. 3 includes a survey timing module 330, a sample representation module 340, and a survey hierarchy module 350. In other embodiments, the survey administration module 250 includes additional, fewer, or different components for various applications.

In some implementations, the survey eligibility module 310 can determine which survey campaigns and/or surveys a user is eligible to receive. As described above, each survey and/or survey campaign can be associated with a series of survey constraints which a user has to meet in order to be eligible to receive that survey. A survey constraint can be a filtering constraint (based on one or more attributes or events associated with the user) or a trigger constraint (based on a recently received event). The survey constraints for each survey can be set up with the survey campaign. In some embodiments, the survey timing module 330 evaluates a user for survey eligibility each time one or more events occur, for example, on session start or when new event or attribute data becomes available for the user.

For example, a filtering constraint can determine user eligibility using attributes based on a user having an attribute of a certain range, or part of a desired set of values, for example if the user is a part of one or more given demographic groups (such as an age group) or if a user's on-file address is within a specified geographic area. Similarly, filtering constraints can use historical event data, determining eligibility based on if the user is (or is not) associated with a specified event within a specified timeframe. Event filtering constraints can count recent event occurrences, time since the event was first recorded for the user, time since the event was last recorded for the user, or if the user has ever triggered the specified event. For example, an event-based filtering constraint can check if a user has logged in (a programmatic event) more than X times within the last week to determine eligibility for a survey aimed at frequent users of the online service application 115.

Similarly, trigger constraints can depend on event data received by the RTSS 140, but instead of relying on stored historical event data, trigger constraints can depend on recent event data (for example, event data from a user's current session using the online service application 115). For example, trigger constraints can select users who have recently performed a specified action within the online service application 115 (based on receiving a programmatic event, such as a logins, cart checkouts, or completed transactions), visits a certain part of the online service application 115 (using URL events, as described above), or interacts with a specific part of a the application UI (through receiving an interaction events for the user). In some implementations, the trigger constraint(s) for a survey can ensure the real-time relevance of the survey to actions the user has just taken (or are currently in the process of taking) as they interact with the online service application. Using trigger constraints as described can lead to higher quality survey responses (as the user still remembers the experience in question) as well as the ability to target surveys to smaller or less prominent interactions the user is unlikely to remember after the fact.

In some implementations, the survey timing module 330 also checks the resurvey rate constraint to prevent users from being spammed by surveys. As described above, the resurvey rate of a survey can be expressed as a minimum number of days between surveys. If a user is within the resurvey window, the survey timing module 330 can determine that the user is ineligible to receive further surveys until outside the resurvey window. In some implementations, the resurvey rate is one survey every 30 days (although the specific resurvey rate can depend on the implementation or be based on the survey campaign).

Each user can be simultaneously eligible for multiple surveys associated with multiple different survey campaigns and the survey timing module 330 can separately evaluate eligibility for each currently active survey campaign. At this point, the survey administration module 250 can identify that user that is eligible to receive the survey, but not when or if that user should be sent a survey.

In some implementations, the survey scheduling module 320 determines if and when a survey should be shown to an eligible user. The survey scheduling module 320 can mitigate or eliminate result bias that could occur due to uneven sampling of users. According to some embodiments, the survey scheduling module 320 collects survey responses over time, to ensure that all users of the online service application 115 have a more equal chance of being selected (and not unintentionally favoring users in certain time zones or who use the application 115 at certain times of day). Similarly, the survey scheduling module 320 can regulate response collection across one or more user attributes (such as user demographics, customer type, etc.) to ensure a representative sample.

For example, a survey campaign can be set up with a fixed sample size of desired responses (per-day or in total), after which response collection is halted. Exceeding the fixed sample size is undesirable, leading to excess costs and unnecessary disruption of users' experiences with surveys, so the survey scheduling module 320 can aim to send out surveys at a relatively constant rate over a few days to get a representative sample of users in the set of responses.

The survey timing module 330 of FIG. 3 can, in some implementations, determine when eligible users should be sent surveys. In some embodiments, each survey or survey campaign is associated with one or more parameters influencing the timing of the survey. Survey timing parameters can be individual timing parameters (affecting when a specific user is sent a survey within their session of using the online service application 115) or campaign-wide timing parameters (controlling the overall rate of survey collection for that survey/campaign over time).

In some implementations, individual timing parameters include a session timing parameter represented as a number of seconds or range of time after the start of a session when the user can be sent the survey. Additionally, a survey can also be associated with event timing parameters associated with certain events. For example, an event timing parameter can specify a range of time after a certain event (in some cases the event triggering the survey) the survey should be sent.

Campaign-level timing parameters, in some embodiments, regulate the overall response collection rate of the survey campaign. In some implementations, campaign timing parameters are set to achieve a roughly target rate of responses per day. For example, a survey campaign can use a sampling rate setting a fixed percentage of eligible users (such as 5% or 10%) to be sent surveys. In some implementations, the sampling rate is set based on the desired sample size and/or desired responses per day and the estimated number of eligible users each day.

In some embodiments, the survey timing module 330 uses a leaky bucket algorithm to regulate the sampling rate of a survey campaign. A leaky bucket algorithm can regulate both the average survey rate and the maximum number of simultaneous surveys sent out at once for a survey campaign. When using a leaky bucket algorithm, each campaign is associated with a "bucket" (a buffer of a predefined size). The bucket is filled by a predetermined amount whenever a survey for the survey campaign is sent and empties ("leaks") at a fixed rate over time. If the bucket is too full to fit a new survey, that campaign is treated as inactive and no further surveys are sent until the buffer empties enough (at the fixed rate) for new surveys to be sent out without exceeding the capacity of the bucket. By varying the size of the bucket and the rate at which it empties, the survey scheduling module 320 can control the maximum rate surveys are sent out (by controlling the rate the bucket empties) and the maximum number of surveys that can be sent out at once (by setting the size of the bucket).

In some implementations, the survey timing model 330 uses a cross-leaky bucket algorithm to determine which survey to send out of a set of survey campaigns the user is eligible for. In a cross-leaky bucket algorithm, the survey timing model 330 simultaneously evaluates the leaky bucket buffer for each eligible campaign and selects a single survey based on the amount/percentage of space left in the buffer (and/or other suitable factors).

In some implementations, the survey scheduling module 320 can schedule a survey to be sent at a future time when the timing parameters are met. Then the survey scheduling module 320 can hold the survey and send it to the user's online service application 115 at the scheduled time. For example, the survey timing module 330 can determine to send a survey to a user based on recently received event data but the survey scheduling module 320 waits to actually transmit the survey to the online service application 115 until the scheduled time are met a few seconds or minutes later (when the timing constraints are met).

The sample representation module 340, in some implementations, can ensure that each survey campaign surveys a representative sample of the total population of users. The sample representation module 340 can calculate the current sampling rate across one or more user attributes (or other characteristics) and compare that to target sampling rates representing a balanced sample. For example, the sample representation module 340 can pause or reduce the rate of collection of survey data for over-sampled groups. In other implementations, the sample representation module 340 assigns a weight to each eligible user measuring the extent that user would contribute to over-sampling or help with under-sampling if surveyed. The survey hierarchy module 340 can then use the generated weights to prioritize which survey the eligible user is sent. Implementing sample representation logic as described can reduce the total number of surveys that need to be sent out to receive a representative sample of responses, saving computing resources (and user annoyance) that may be used to run additional surveys.

In many situations, a user will only be eligible for one active survey (which the survey scheduling module 320 can then send to the user), however, a given user may be eligible for multiple surveys simultaneously in some cases. The survey eligibility process can be first performed in parallel for each separate survey campaign, therefore if multiple survey campaigns are running simultaneously for the same online service application 115 a user may be eligible to be sent multiple surveys. If a user is eligible for multiple surveys, the survey hierarchy module 350 can determine which survey should be sent to the user. As described above, the survey timing module 330 can also use a cross-leaky bucket algorithm to select among multiple potential surveys.

In some implementations, the survey hierarchy module 350 ranks the potential surveys based on the current sample breakdown for each survey (for example, assigning a score based on how needed that user is for a representational sample for that survey or using weights generated by the survey hierarchy module 350). Alternatively, the survey hierarchy module 350 can select a survey randomly or semi-randomly or select a survey based on a predetermined hierarchy. In some implementations, the survey hierarchy module 350 selects between surveys using an estimated eligible user rate for each campaign (prioritizing surveys with more restrictive survey constraints that less users meet on average).

In some implementations, after a survey is scheduled to be sent to an eligible user the survey scheduling module 320 stores an event indicating that the survey was sent. Similarly, the leaky bucket for the survey can be updated to reflect the survey being sent and the user's resurvey window can be reset. Then, the survey administration module can send the survey data to the user's online service application 115 for display. For example, the survey data can include an identifier of the survey and survey content containing one or more questions for the user to answer.

Automatic Survey Response Analysis

Figure 4:
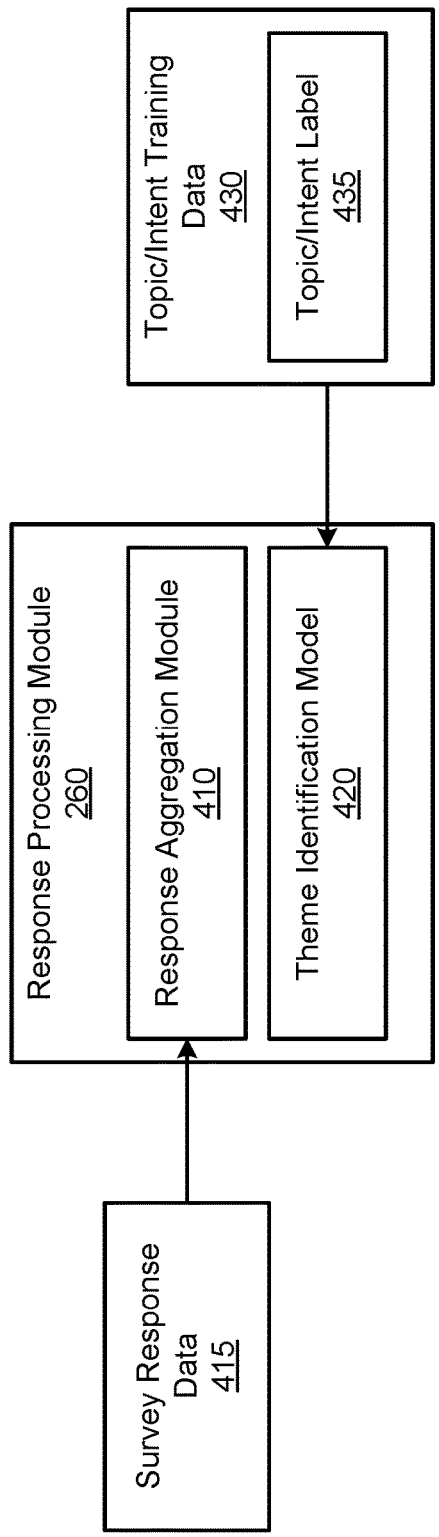
FIG. 4 is a block diagram of a response processing module of a real-time survey system, in accordance with an example embodiment.

FIG. 4 is a block diagram of a response processing module of a real-time survey system, in accordance with an example embodiment. The response processing module 260 shown in FIG. 4 includes a response aggregation module 410 which collects survey response data 415 and a theme identification model 420 which is a machine learning model trained on topic/intent training data 430 (with topic/intent labels 435) used to analyze the aggregated responses. In other embodiments, the response processing module 260 includes additional, fewer, or different components for various applications.

In some implementations, the response aggregation module 410 receives and organizes survey response data 415 sent by online service applications 115. Each received survey response 415 can include an indication of the survey/survey campaign the results are in response to, a set of one or more question responses provided by the user taking the survey, and, in some embodiments, an identifier of the associated user/user device 110. After receiving a survey response, the response aggregation module 410 can validate and store the survey response in the survey data store 270 for further analysis. In some implementations, the response aggregation module 410 further preprocesses the received data, for example by anonymizing received survey responses 415 by replacing a user identification with generic attribute/event tags (for example for later demographic analysis).

In general, a response to a survey question falls into one of two broad categories, predetermined/multiple choice responses and freeform/open-ended responses. For example, a predetermined response includes any response to a question with a fixed number of answers that are predetermined as part of the survey campaign, such as yes or no questions or multiple choice questions where a user selects from a preset list of options. The response processing module 260, in some embodiments, can aggregate statistics about response frequency for predetermined/multiple choice responses. In contrast, responses to freeform questions (where a user is asked to submit their own text/images/data) can include unstructured text which is comparatively hard to automatically analyze. Despite being hard to analyze, freeform responses can allow users to provide unexpected or unanticipated feedback in a way that isn't possible with predetermined responses. When analyzing freeform responses, the response processing module 260 can perform thematic analysis by automatically grouping survey responses based on identified themes (general trends/subjects of a response) to return to the online service server 130. The response processing module 260 can additionally analyze survey responses to determine other signals, such as emotional response, general sentiment analysis, or customer request identification, that can be used as an input to the thematic analysis or separately aggregated and provided in addition to thematic analysis results.

In some embodiments, the response processing module 260 uses a theme identification model 420 to perform automatic thematic analysis on received freeform text responses. When fed an input of a freeform text response to a survey question, the trained theme identification model 420 can output a topic/intent pair for the question response. In some implementations, the topic of a response is the primary portion of the online service application 115, action, or object the response is about, such as "news article," "app user interface" or "cat pictures." Similarly, the intent of a response represents the reason the user is sharing that information, for example a "bug report," "feature request," "sharing sentiment," or the like. Together, the topic/intent pair forms the theme of that response. For example, a "news article" topic could be paired with an intent of "request for more" to give an overall theme of "add more articles," a topic/intent pair of "news article"/"is critical of accuracy" leads to a theme of "the articles are inaccurate," a topic/intent pair of "news article"/"can't access" leads to a theme of "having trouble accessing articles."

A machine learning model is an algorithm that is automatically generated based on a set of training data (generally using iterative methods) to predict one or more output values based on a set of input features. A training data set can contain many input features and, in some implementations, the corresponding output values. Depending on the embodiment, the survey administration module 250 can use many different machine learning techniques, including supervised learning (using training data labeled to include correct output values), unsupervised learning (using unlabeled training data), reinforcement learning, deep learning or neural network algorithms, active learning, and other suitable techniques or algorithms.

In some implementations, the theme identification model 420 is an NLP model trained to identify both the topic and the intent of a freeform text answer. Natural Language Processing (NLP) algorithms used by the response processing module 260 can include (but are not limited to) support vector machines, Bayesian networks, conditional random field, and deep learning/neural networks. In some implementations, the topic/intent training data set 430 can include example text phrases (and/or labeled survey responses) including both topic and intent labels for training the theme identification model 420 using supervised learning techniques.

Example Survey UI

FIG. 5 shows an example user interface for displaying real-time survey content to a user of the application, in accordance with an example embodiment. The user device 500 of FIG. 5 includes online service application content 510 overlaid with microsurvey content 520.

The online service application content 510 can include any content or UI elements used for a user to interact with the online service and/or online service server 130. For example, online service application content 510 can encompass ecommerce functionality (such as a checkout or cart UI), content viewing (such as an article reader or video player), video games, or the like.

In some implementations, the survey UI 220 can show survey content (such as microsurvey content 520) by modifying an interface of the online service application 115 to include the received survey content for display. The microsurvey content 520 can include one or more interactive graphical elements that, upon interaction by a user, allow the users to review survey questions and provide answers. For example, a predetermined choice question can be associated with a series of selectable answers while a freeform text question can allow users to enter their answer into a text box. After completion of the microsurvey by the user, the survey UI 220 is configured to modify the interface of the application to remove the survey content 520 such that the user can return to interacting with the online service application content 510.

Real-Time Survey Processes

Figure 6:
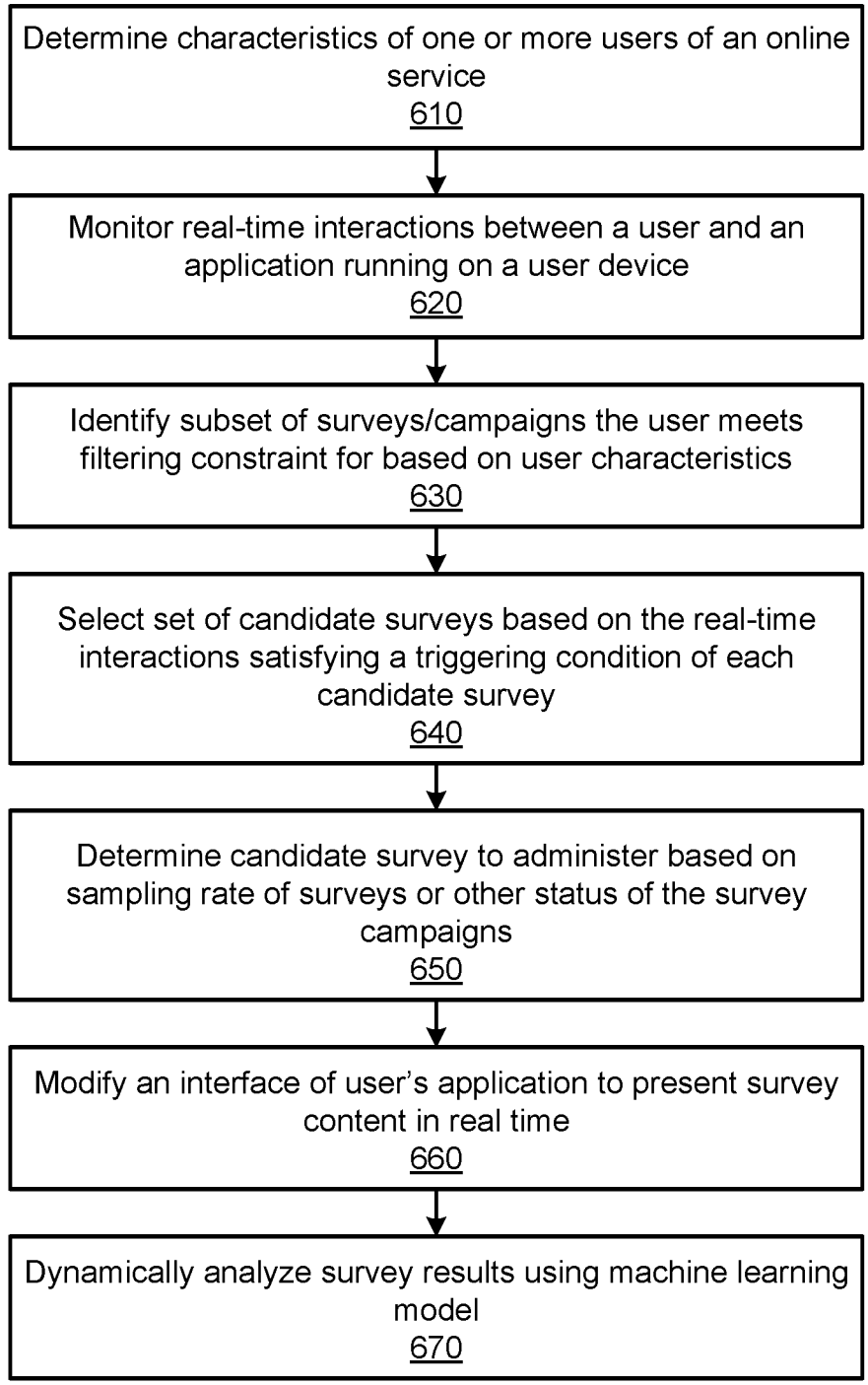
FIG. 6 is a flowchart illustrating an example process for selecting, displaying, and analyzing a real-time survey displayed to a user via a user device, according to an embodiment.

FIG. 6 is a flowchart illustrating an example process for selecting, displaying, and analyzing a real-time survey displayed to a user via a user device, according to an embodiment. The process 600 begins when the RTSS determines 610 characteristics of one or more users of an online service. As described above, these characteristics can include attributes and historical events associated with users. The RTSS can then monitor 620 one or more real time interactions (for example, events) between a user and an online service application. after receiving new event data, the RTSS identifies 630 a subset of surveys or survey campaigns the user meets filtering constraints for based on the gathered user characteristics (including user attributes and event data).

Similarly, the RTSS narrows the subset by selecting 640 a set of candidate surveys based on the real-time interactions (event data) satisfying a trigger constraint for each candidate survey. Then the RTSS determines 650 a single candidate survey to administer based on sampling rate of surveys or other status of the survey campaigns. To administer the survey, the RTSS sends instructions to modify 660 an interface of user's online service application to present survey content to the user in real time (for example following a monitored triggering event). The RTSS can then receive and dynamically analyze 670 the survey results using a machine learning model among other analysis techniques.

Figure 7:
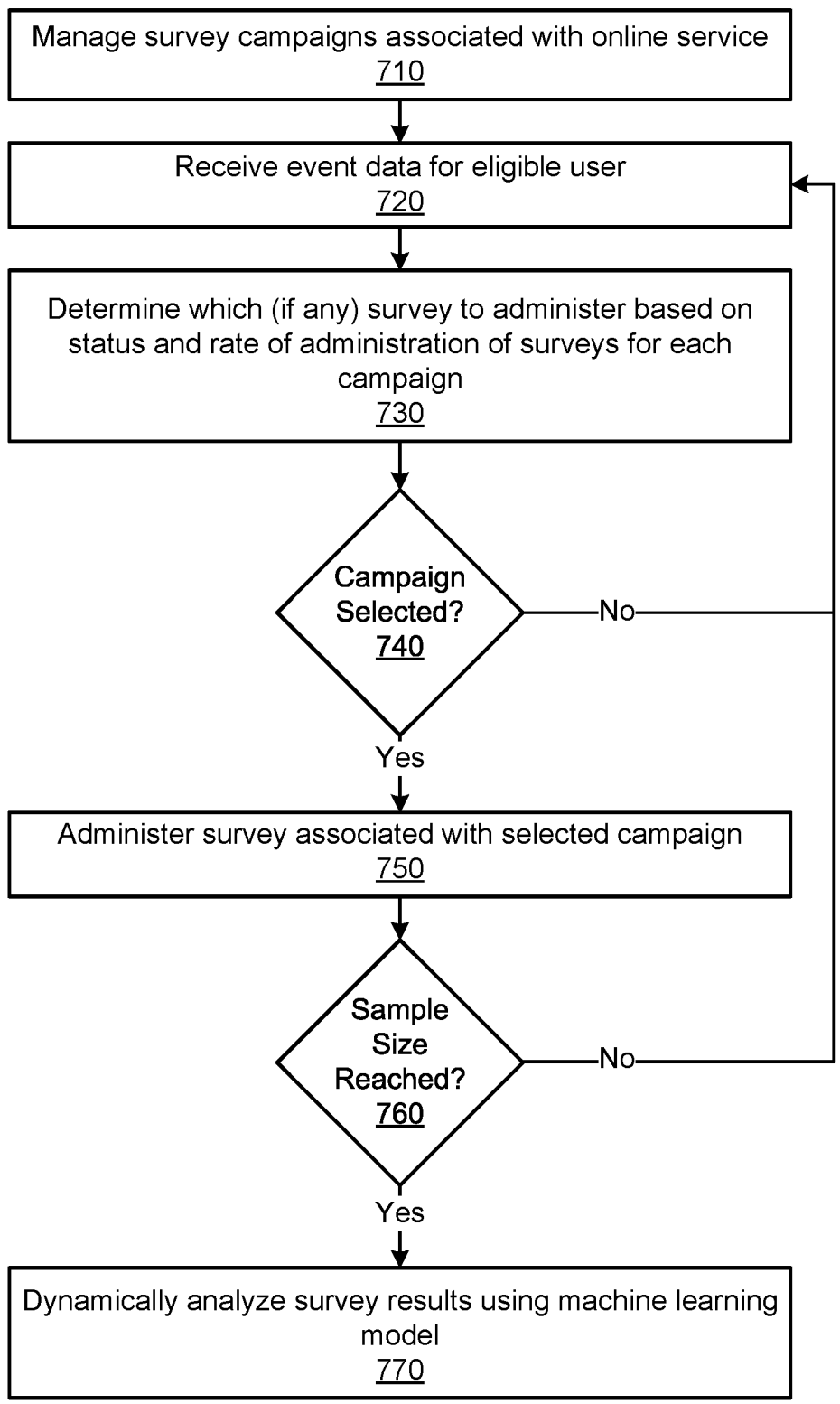
FIG. 7 is a flowchart illustrating an example process for dynamically managing and analyzing results from a real-time survey campaign, according to an embodiment.

FIG. 7 is a flowchart illustrating an example process for dynamically managing and analyzing results from a real-time survey campaign, according to an embodiment. The process 700 begins with a RTSS that can manage 710 a set of survey campaigns associated with an online service. Then, after the RTSS receives 720 event data for an eligible user, the RTSS determines 730 which (if any) survey to administer based on status and rate of administration of surveys for each campaign. If a survey campaign is selected 740 the RTSS proceeds to administer 750 a survey associated with selected campaign, otherwise the RTSS returns to step 720 and waits for new event data from another user. After administering the survey and receiving survey results, the RTSS can check if a desired sample size is reached 760 (or another condition for ending the survey is met, such as a target cost or duration of the survey being reached). If the sample size has been reached, the RTSS ends data collection for the survey and can dynamically analyze 770 the gathered survey results using machine learning model. Otherwise, the RTSS returns to step 720 to continue sending surveys and collecting additional survey responses.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   generating a set of training data comprising historical survey responses each labeled with a response topic and a response intent;
   training a neural network to identify topics and intents of survey responses from users using the generated set of training data;
   monitoring, in real-time, interactions by a user with an application running on a user device;
   determining one or more characteristics of the user;
   querying a microsurvey database using the determined one or more characteristics of the user to identify a subset of microsurveys the user is eligible to receive, each of the identified subset of microsurveys corresponding to a trigger constraint;
   querying the identified subset of microsurveys with a monitored interaction to identify a second subset of microsurveys corresponding to trigger constraints satisfied by the monitored interaction;
   selecting a microsurvey from the second subset of microsurveys based on a sampling rate of each of the second subset of microsurveys;
   modifying an interface of the application running on the user device to include the selected microsurvey, the display of the selected microsurvey comprising an interactive graphical element that, upon completion of the microsurvey by the user, is configured to modify the interface of the application to remove the selected microsurvey; and
   applying the neural network to a response to the microsurvey from the user to identify a set of topics and a set of intents associated with the response.

2. The method of claim 1, further comprising:
responsive to modifying the interface of the application to include the selected microsurvey for display, collecting a result of the microsurvey comprising one or more question responses.

3. The method of claim 2, further comprising:
aggregating the result of the microsurvey with a plurality of other microsurvey results;
analyzing the set of microsurvey results using thematic analysis; and
grouping the microsurvey results based on theme based on the thematic analysis.

4. The method of claim 3, further comprising:
transmitting the grouped set of microsurvey results to an online system associated with the application.

5. The method of claim 1, wherein selecting a microsurvey from the second subset of microsurveys comprises:
applying a leaky bucket algorithm to select a microsurvey from the second subset of microsurveys.

6. The method of claim 1, wherein the leaky bucket algorithm is a cross-leaky bucket algorithm.

7. The method of claim 1, wherein selecting a microsurvey from the second subset of microsurveys comprises:
selecting a time within the user's session of the application to display the microsurvey.

8. A non-transitory computer-readable storage medium comprising instructions which, when executed by a processor, cause the processor to perform the steps of:
generating a set of training data comprising historical survey responses each labeled with a response topic and a response intent;
training a neural network to identify topics and intents of survey responses from users using the generated set of training data;
monitoring, in real-time, interactions by a user with an application running on a user device;
determining one or more characteristics of the user;
querying a microsurvey database using the determined one or more characteristics of the user to identify a subset of microsurveys the user is eligible to receive, each of the identified subset of microsurveys corresponding to a trigger constraint;
querying the identified subset of microsurveys with a monitored interaction to identify a second subset of microsurveys corresponding to trigger constraints satisfied by the monitored interaction;
selecting a microsurvey from the second subset of microsurveys based on a sampling rate of each of the second subset of microsurveys;
modifying an interface of the application running on the user device to include the selected microsurvey, the display of the selected microsurvey comprising an interactive graphical element that, upon completion of the microsurvey by the user, is configured to modify the interface of the application to remove the selected microsurvey; and
applying the neural network to a response to the microsurvey from the user to identify a set of topics and a set of intents associated with the response.

9. The non-transitory computer-readable storage medium of claim 8, wherein the steps further comprise:
responsive to modifying the interface of the application to include the selected microsurvey for display, collecting a result of the microsurvey comprising one or more question responses.

10. The non-transitory computer-readable storage medium of claim 9, wherein the steps further comprise:
aggregating the result of the microsurvey with a plurality of other microsurvey results;
analyzing the set of microsurvey results using thematic analysis; and
grouping the microsurvey results based on theme based on the thematic analysis.

11. The non-transitory computer-readable storage medium of claim 10, wherein the steps further comprise:
transmitting the grouped set of microsurvey results to an online system associated with the application.

12. The non-transitory computer-readable storage medium of claim 8, wherein selecting a microsurvey from the second subset of microsurveys comprises:
applying a leaky bucket algorithm to select a microsurvey from the second subset of microsurveys.

13. The non-transitory computer-readable storage medium of claim 8, wherein the leaky bucket algorithm is a cross-leaky bucket algorithm.

14. The non-transitory computer-readable storage medium of claim 8, wherein selecting a microsurvey from the second subset of microsurveys comprises:
selecting a time within the user's session of the application to display the microsurvey.

15. A method comprising:
collecting, by a network device, interaction data relating to interactions by a user with an application running on a user device and user data relating to characteristics of the user;
comparing, by the network device, the collected interaction data and the collected user data to trigger constraints associated with each of a set of microsurveys within a microsurvey database; and
collecting, by the network device, additional interaction data when the collected interaction data and collected user data satisfy the trigger constraints of a microsurvey, the additional interaction data comprising interactions by the user with the microsurvey when an interface of the application running on the user device is modified to display the microsurvey.

16. The method of claim 15, further comprising:
aggregating the additional interaction data;
analyzing the collected additional interaction data using thematic analysis to identify a set of themes of the additional interaction data.

17. The method of claim 15, wherein comparing the collected interaction data and the collected user data to trigger constraints associated with each of a set of comprises:
applying a leaky bucket algorithm to select a microsurvey from the set of microsurveys.

18. The method of claim 16, wherein the leaky bucket algorithm is a cross-leaky bucket algorithm.

* * * * *